(12) United States Patent
Sacks et al.

(10) Patent No.: US 6,510,752 B1
(45) Date of Patent: Jan. 28, 2003

(54) METHOD AND APPARATUS FOR TESTING MICROACTUATORS ON A SUSPENSION ASSEMBLY

(75) Inventors: Alexei H. Sacks, Edina, MN (US); James H. McGlennen, Eden Prairie, MN (US); Albert van der Schans, Minnetonka, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/426,349

(22) Filed: Oct. 25, 1999

Related U.S. Application Data
(60) Provisional application No. 60/121,146, filed on Feb. 22, 1999.

(51) Int. Cl.[7] .................. G01N 19/00; G01R 33/12; G11B 5/596
(52) U.S. Cl. .................. 73/865.9; 73/1.79; 324/210; 324/212; 360/75; 360/78.05; 360/78.12
(58) Field of Search .................. 73/1.79, 1.89, 73/865.9; 324/210, 212; 360/75, 78.05, 78.12

(56) References Cited

U.S. PATENT DOCUMENTS

| | | | | |
|---|---|---|---|---|
| 4,530,019 A | * | 7/1985 | Penniman | 360/77 |
| 4,811,144 A | | 3/1989 | Miller et al. | 360/106 |
| 4,902,971 A | | 2/1990 | Guzik et al. | 324/212 |
| 5,189,578 A | * | 2/1993 | Mori et al. | 360/78.05 |
| 5,254,946 A | | 10/1993 | Guzik | 324/262 |
| 5,382,887 A | | 1/1995 | Guzik et al. | 318/652 |
| 5,402,400 A | * | 3/1995 | Hamada et al. | 360/75 |
| 5,465,183 A | * | 11/1995 | Hattori | 360/75 |
| 5,621,178 A | * | 4/1997 | Van Pelt et al. | 73/862.381 |
| 5,654,841 A | * | 8/1997 | Hobson et al. | 360/75 |
| 5,793,571 A | | 8/1998 | Jurgenson et al. | 360/104 |
| 5,801,531 A | | 9/1998 | Viches et al. | 324/212 |
| 5,805,375 A | * | 9/1998 | Fan et al. | 360/78.12 |
| 5,862,015 A | * | 1/1999 | Evans et al. | 360/75 |
| 5,872,674 A | * | 2/1999 | Eddy | 360/77.04 |
| 5,946,158 A | * | 8/1999 | Nazarian et al. | 360/77.04 |
| 5,998,994 A | * | 12/1999 | Mori | 324/212 |
| 6,078,476 A | * | 6/2000 | Magee et al. | 360/106 |
| 6,088,181 A | * | 7/2000 | Tanaka | 360/66 |

* cited by examiner

*Primary Examiner*—Hezron Williams
*Assistant Examiner*—Michael Cygan
(74) *Attorney, Agent, or Firm*—Theodore M. Magee; Westman, Champlin & Kelly, P.A.

(57) ABSTRACT

A method and apparatus are provided for testing a microactuator that forms part of a suspension assembly in a disc drive. The method and apparatus test the microactuator before placing the suspension assembly in a disc drive. In the invention, the head is positioned over a track on a disc based in part on servo information read from the disc. At least one input signal is then applied to at last one microactuator on the suspension assembly. Servo information is then read from the disc to determine a change in the position of the head. By comparing the change in the position of the head to the input signal applied to the microactuator, a performance characteristic of a microactuator can be determined.

17 Claims, 15 Drawing Sheets

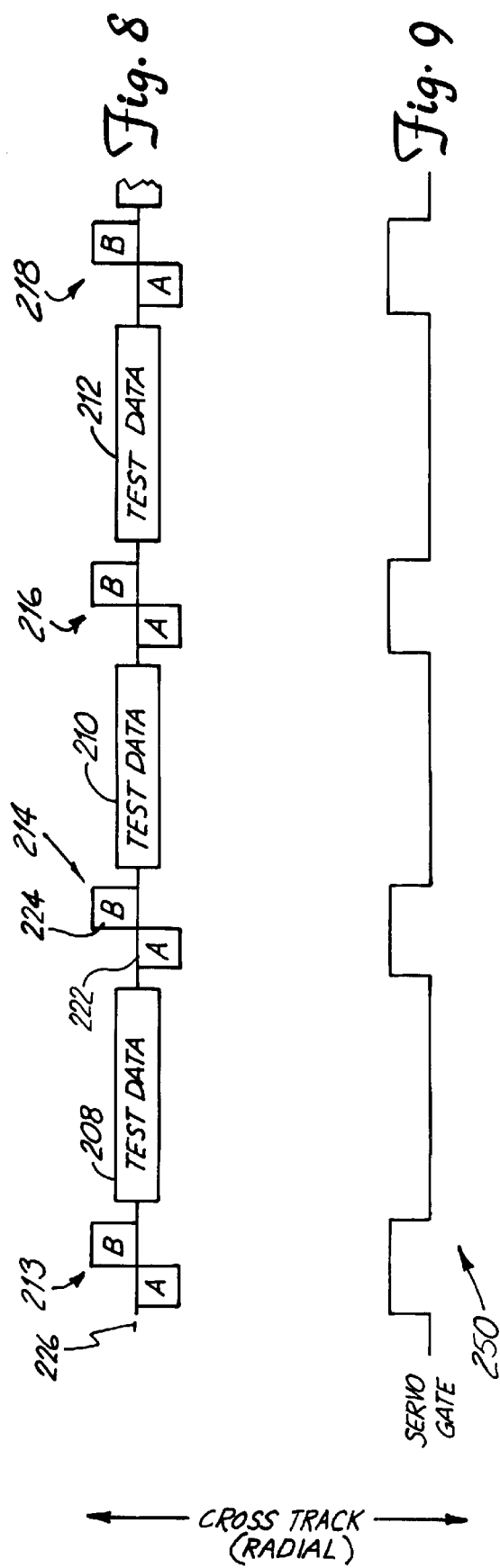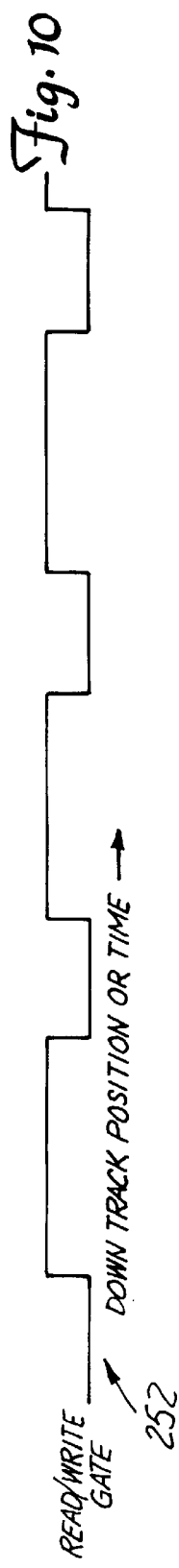

METHOD AND APPARATUS FOR TESTING MICROACTUATORS ON A SUSPENSION ASSEMBLY

REFERENCES TO RELATED APPLICATIONS

The present application claims priority from the U.S. Provisional Application having Serial No. 60/121,146, filed on Feb. 22, 1999 and entitled "MICROACTUATOR TEST METHOD IN A READ/WRITE DATA TESTER." The present application is related to a U.S. Patent Application filed on even date herewith, owned by a common Assignee, having ser. No. 09/425,808, and entitled "METHOD AND APPARATUS FOR CLOSED LOOP SPIN-STAND TESTING.

FIELD OF THE INVENTION

The present invention relates to disc drive storage devices. In particular, the present invention relates to microactuators in disc drives.

BACKGROUND OF THE INVENTION

In a disc drive storage device, data is read from and written to concentric tracks located on a disc using a read head and a write head, respectively. In the disc drive, the read head and write head are supported by a support arm and a suspension assembly, which maintain the head near the disc surface. To position the read head and/or write head over a desired track, the disc drive typically uses a closed-looped servo system that moves the head based on a desired position for the head set by an external controller and a current position of the head determined by a portion of the servo system. In many such servo systems, the head is moved across the disc surface by a voice coil motor, which is connected to the support arm and suspension assembly.

In recent years, it has been proposed that microactuators be added at various locations along the support arm and suspension assembly to provide fine servo positioning control and to increase the frequency response of the servo system. To implement this idea in a manufacturing setting, the microactuators must be tested before they are placed in the drives. Such pre-build testing reduces the losses associated with constructing a drive with faulty components and helps to identify steps in the build process that damage the microactuators. Although current systems provided adequate testing of the microactuators, the tests use an external measuring system that must be properly aligned with the microactuator in order to detect its movement. Because the measuring system is not connected directly to the microactuator, the testing process is prone to error and the step of aligning the equipment takes additional time during the testing phase.

SUMMARY OF THE INVENTION

A method and apparatus are provided for testing a microactuator that forms part of a suspension assembly in a disc drive. The method and apparatus test the microactuator before placing the suspension assembly in a disc drive. In the invention, the head is positioned over a track on a disc based in part on servo information read from the disc. At least one input signal is then applied to at least one microactuator on the suspension assembly. Servo information is then read from the disc to determine a change in the position of the head. By comparing the change in the position of the head to the input signal applied to the microactuator, a performance characteristic of a microactuator can be determined.

BRIEF DESCRIPTION OF THE DRAWINGS

FIG. 8 is a more detailed view of a test track under an embodiment of the present invention.

FIG. 9 is a timing diagram showing servo date timing.

FIG. 10 is a timing diagram showing test data read/write date timing.

DETAILED DESCRIPTION OF ILLUSTRATIVE EMBODIMENTS

Figure 1:
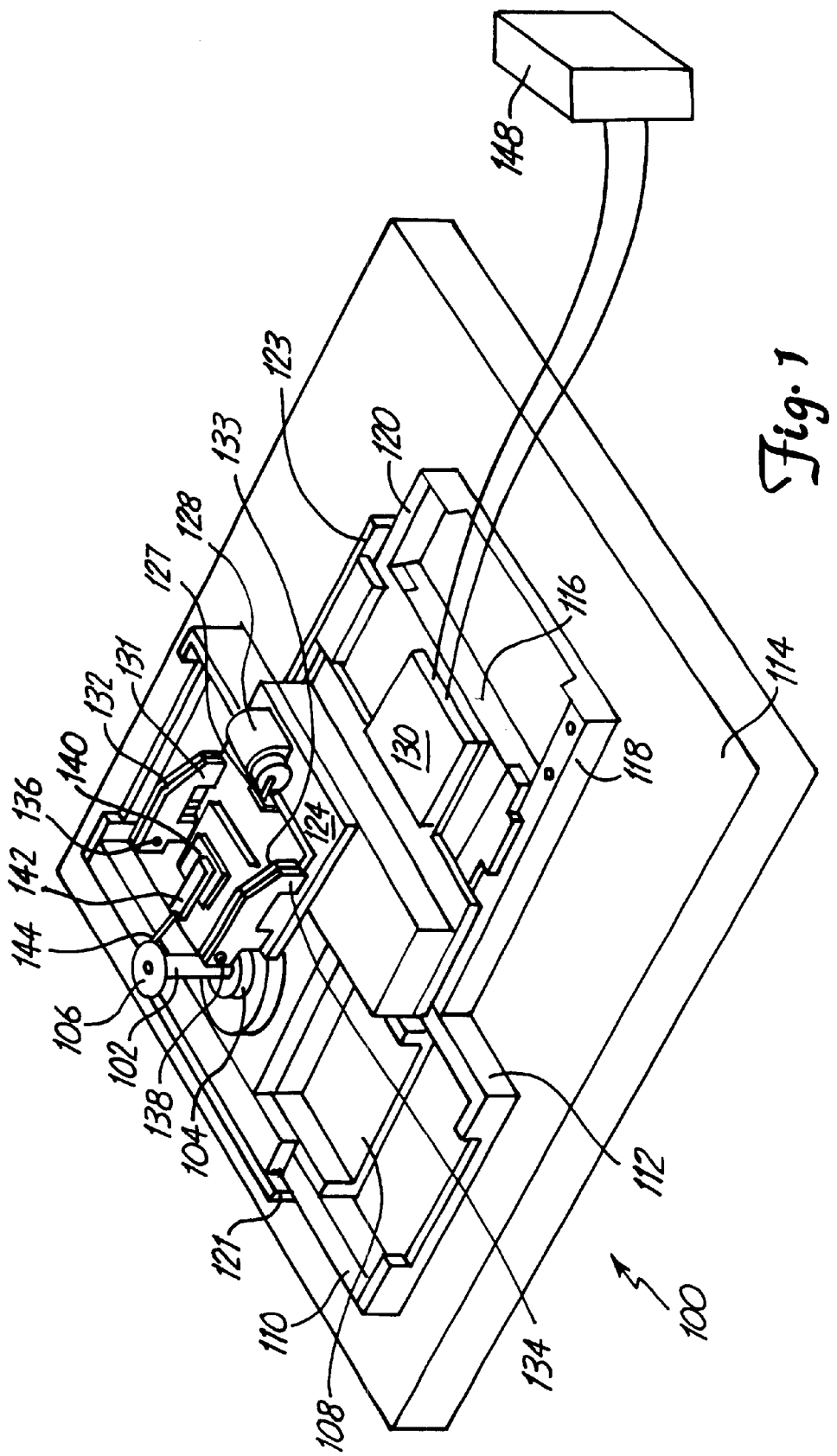
FIG. 1 is a perspective view of a spin-stand of the present invention.
Figure 2:
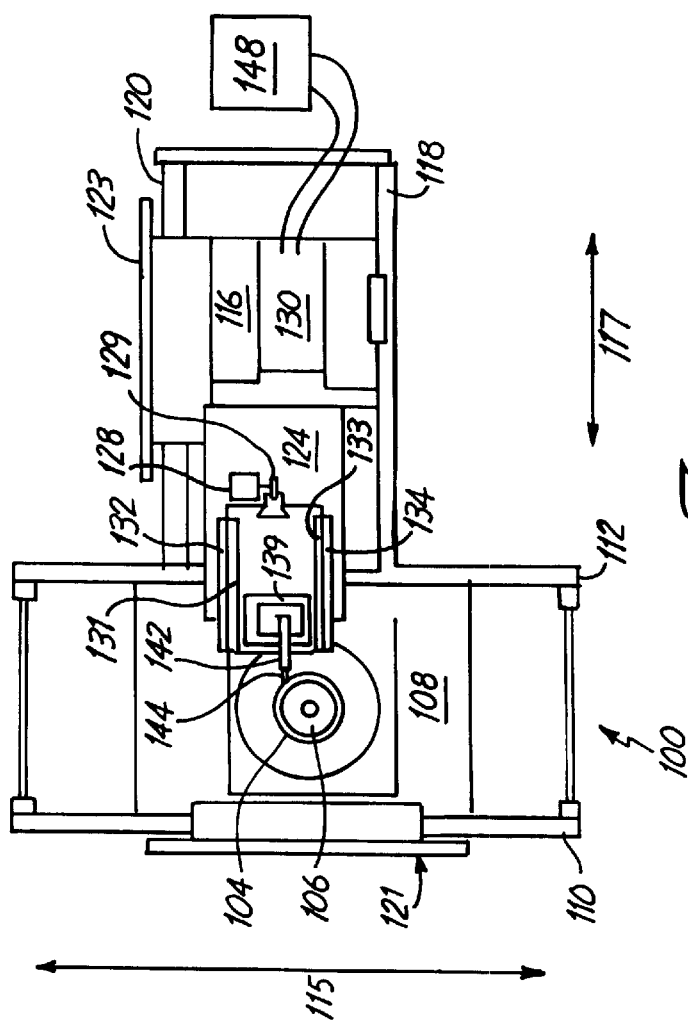
FIG. 2 is a top view of the spin-stand of FIG. 1.
Figure 3:
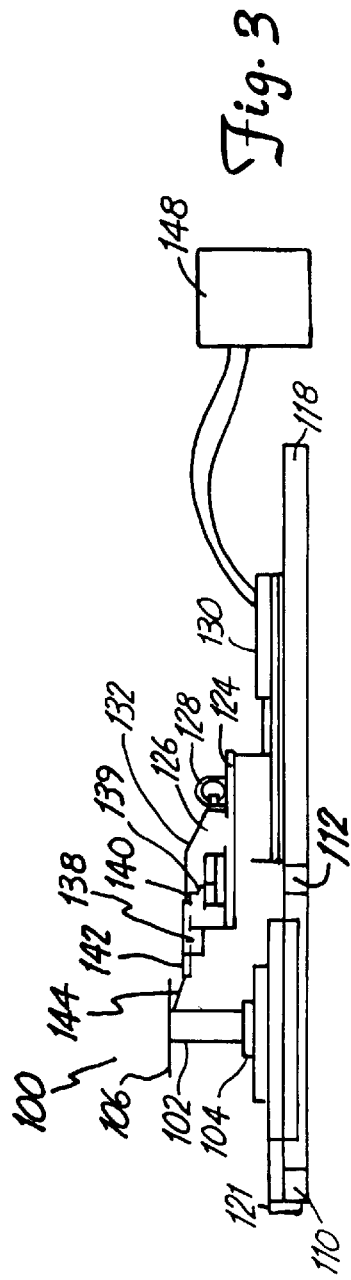
FIG. 3 is a side view of the spin-stand of FIG. 1.

FIGS. 1, 2, and 3 are perspective, top, and side views, respectively, of a spin-stand 100 of the present invention. Spin-stand 100 includes a disc 106 mounted on a spindle 102, which is rotated by spindle motor 104. Spindle motor 104 rests on a platform 108 that moves between two guide rails 110 and 112. In one embodiment, platform 108 is supported by a cushion of air during movement and is stabilized in a particular position by the application of a vacuum between platform 108 and a granite face 114 directly below platform 108. For purposes of reference, movement of platform 108 along guides 110 and 112 is considered to be in the "X" direction as shown by arrows 115 of FIG. 2. A position encoder 121 is located along guide 110 to provide an indication of the position of platform 108.

Spin-stand 100 also includes a carriage 116 that moves between rails 118 and 120 in the Y direction shown by arrows 117. Like platform 108, carriage 116 is supported by a cushion of air during movement and is locked into position by applying a vacuum between carriage 116 and granite base 114. A position encoder 123 is located along guide 120 to provide an indication of the position of platform 116.

In one embodiment, carriage 116 and platform 108 both move sing electromotive motors mounted between one of the guide rails and the respective platform or carriage. Other types of motors, such as a stepper motor for example, may be used in place of the electromotive motors.

Carriage 116 supports a printed circuit board 130 and a support platform 124. Support platform 124 includes a pair of support brackets 132, 134 that are connected by respective pivot pins 136 and 138 to a pair of support brackets 131, 133 on a pivoting platform 126. Through support brackets 131, 132, 133, and 134, support platform 124 supports pivoting platform 126 so that it may pivot about pivot pins 136 and 138. Support platform 124 also supports a pivot motor 128, which has an eccentric cam 129 that is in contact with a lever arm 127 on pivoting platform 126.

Pivoting platform 126 supports a mounting platform 139 that provides a base for a piezo platform 140. Piezo platform 140 is connected to a suspension chuck 142 that holds a disc drive suspension 144 as shown in more detail below. Piezo platform 140 is connected to suspension chuck 142 through piezo elements that are able to move suspension chuck 142 in the "X" direction as shown by arrows 115. The piezo elements of piezo platform 140 are able to move suspension chuck 142 by distances of less than 10 nanometers in response to electrical signals received from a control circuit.

During head loading operations, pivot motor 128 rotates eccentric cam 129 causing lever arm 127 and the back end of pivoting platform 126 to rotate upward about pivot pins 138 and 136. Suspension chuck 142, which carries suspension 144, is then placed on piezo platform 140 and spindle motor 104 is activated so that disc 106 rotates at a desired speed. With the suspension loaded, carriage 116 is moved forward so that a head at the end of suspension 144 moves under disc 106. Support platform 108 is also moved so that the head is positioned at a desired radius along disc 106. When the head nears the desired disc location, motor 128 rotates eccentric cam 129 back so that pivoting platform 126 returns to its level position and the head is brought into proximity with disc 106. The head on suspension 144 then flies over the surface of disc 106.

The head on suspension 144 is connected by electrical leads to printed circuit 130, which has further connections to a test box 148. Test box 148 controls the types of tests performed on the head. In particular, test box 148 designates the location for the test track, the data to be written to the disc, and the position of the read head within the written track during read back of the test data. Using the piezo elements of piezo platform 140, the read head can be moved to a number of different locations within a track during read back, so that the profile of the read head can be determined.

Figure 4:
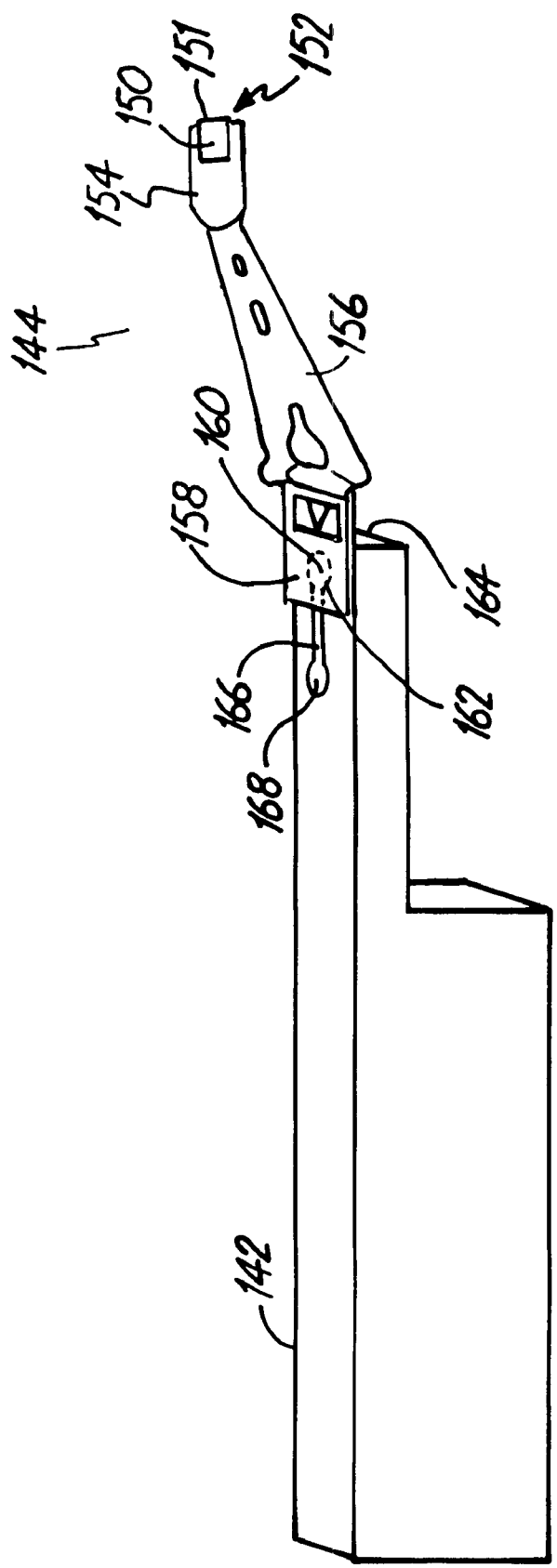
FIG. 4 is a perspective view of a suspension chuck and a suspension under the embodiment of the present invention.

FIG. 4 provides a more detailed perspective view of suspension chuck 142 and suspension 144. Suspension 144 includes a gimble 154 that is connected to a slider 150 containing one or more heads 151 on a trailing edge 152. Suspension 144 also includes a flexure arm 156 and a base plate 158. Base plate 158 includes a boss 160 that extends into suspension chuck 142 through a hole 162. Hole 162 is in communication with a channel 164 and a second channel 166. Channel 164 extends to the end of suspension chuck 142 and channel 166 extends to spreader hole 168. By inserting a pin in spreader hole 168, hole 162 can be widened so that boss 160 can be inserted into the hole. When the pin is removed from hole 168, hole 162 becomes smaller causing suspension chuck 142 to grasp boss 160.

Figure 5:
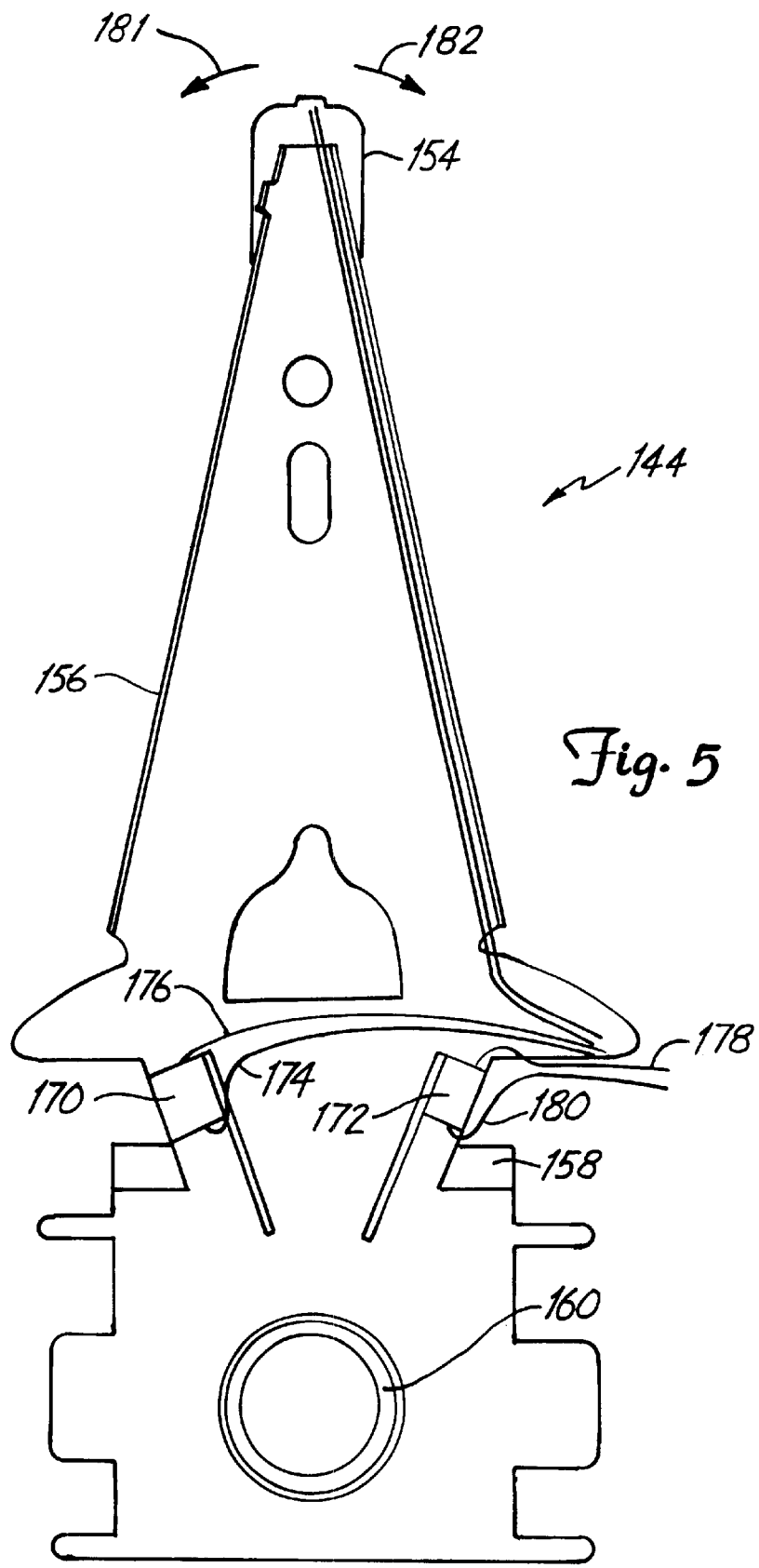
FIG. 5 is a top view of a suspension with a microactuator.

FIG. 5 provides a top view of suspension 144. In FIG. 5, flexure arm 156 includes two microactuators 170 and 172. In one embodiment, microactuators 170 and 172 are capable of contracting or expanding depending on a voltage applied by respective conducting lines 174, 176 and 178, 180. In one embodiment, microactuator 170 is contracted while microactuator 172 is expanded so that the end of suspension 144 moves in a direction 181. At other times, microactuator 172 is contracted while microactuator 170 is expanded to move the end of suspension 144 in a direction 182. The movement of the microactuators can be controlled by a circuit either in circuit board 130 or in test box 148 of FIGS. 1, 2 and 3.

The present invention is not limited to the particular location and type of microactuators shown in FIG. 5. In fact, microactuators may be present in many different configurations along suspension 144. In particular, microactuators may exist between flexure arm 156 and gimble 154, along slider 150 and between slider 150 and head 152. In addition, multiple microactuators may be used within the same suspension assembly with their movement coordinated by a circuit on circuit board 130 or in test box 148.

Figure 6:
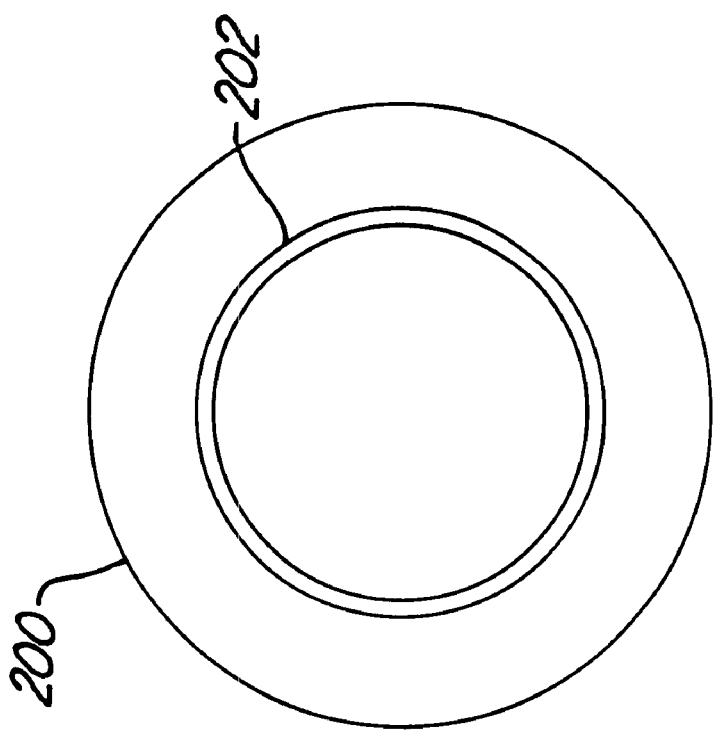
FIG. 6 is a top view of a disc of the prior art.

As mentioned above, prior art spin-stands do not use track following to position the head over a track. As such, test tracks of the prior art do not include servo regions. An example of a disc with a test track of the prior art is shown in FIG. 6 where disc 200 includes a written track 202 that does not include servo regions. Instead, written track 202 includes only test data.

Under the present invention, the test track includes servo regions written onto the disc at various circumferential locations. An example of such a disc 204 is shown in FIG. 7, and includes a circumferential track 206 having data areas such as data areas 208, 210, and 212 that are interspersed with servo areas such as servo areas 213, 214, 216 and 218.

Figure 7:
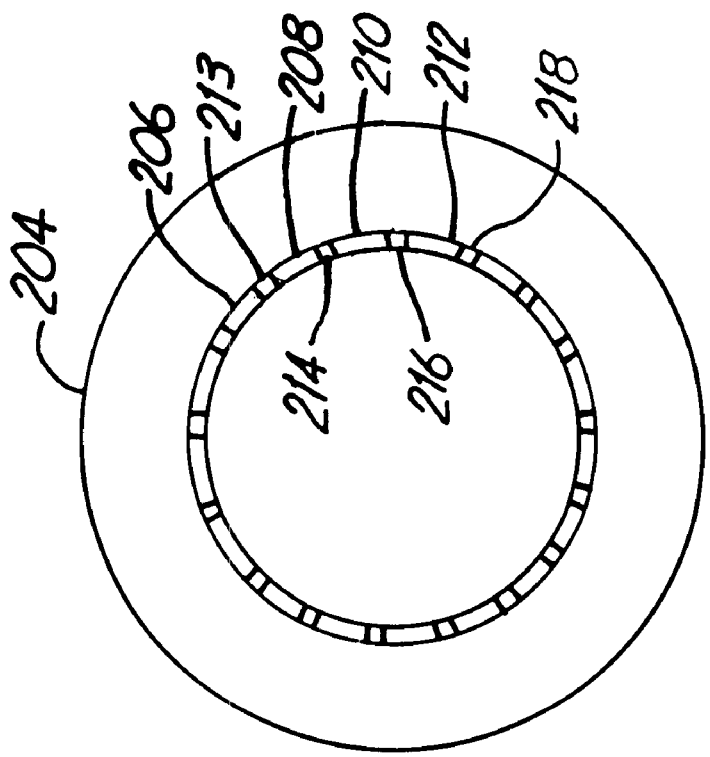
FIG. 7 is a top view of an embodiment of the present invention.

FIG. 8 shows a more detailed view of one embodiment of track 206 of FIG. 7, showing servo areas 213, 214, 216, and 218 and test data areas 208, 210, and 212. In FIG. 8, the cross track or radial direction is shown vertically and the down track direction or time is shown horizontally. Each servo region consists of an "A" burst and a "B" burst such as "A" burst 222 and "B" burst 224 of servo region 214. "A" burst 222 and "B" burst 224 are radially offset from each other such that they share a common border along track center 226 of the test track. The test data written in test data regions 208, 210, and 212 is preferably written so that it is centered on track center line 226.

Since prior art systems do not include a servo region, the read and write channels do not have to be concerned with handling both test data and servo data. However, under the present invention, the read and write channel must accommodate both servo data and test data. To accomplish this, the present invention utilizes two gating signals. The first gating signal is a servo gating signal 250 shown in FIG. 9, which is high during servo regions 213, 214, 216 and 218 and is low at all other times. The second gating signal is a read/write gating signal 252 shown in FIG. 10, which is high during test data regions 208, 210, and 212 and is low at all other times. For clarity, FIGS. 9 and 10 are aligned with FIG. 8 to show the alignment between the gating signals and the position of the read/write head during those gating signals.

In one embodiment, servo gating signal 250 and read/write gating signal 252 are generated based on a once-around index read from the spindle of the spin-stand. In particular, a position encoder located on the spindle indicates the index's position. Because of limitations of the position encoder, the timing between the index signal and the actual index position can vary ±100 nsec. To accommodate this jitter, the transitions of servo gating signal 250 and read/write gating signal 252 are not aligned with each other. Instead, a small period of time passes between when read/write gating signal 252 has a transition and when servo gating signal 250 has a transition. This time period provides a tolerance to the index jitter and helps to ensure that test data does not write over servo data on the disc.

Figure 11:
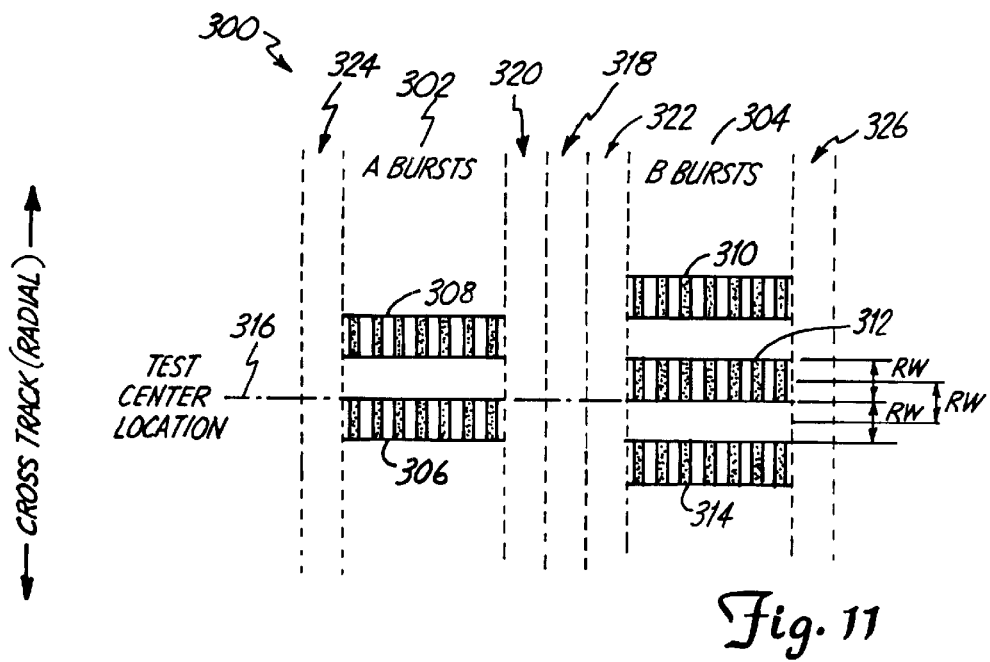
FIG. 11 is a more detailed diagram of a servo region under one embodiment of the invention.

FIG. 11 shows a more detailed layout of a servo region 300 for an embodiment of the present invention. Servo region 300 includes "A" burst region 302 and "B" burst region 304. "A" burst region 302 includes two radially offset bursts 306 and 308, where each burst includes a series of magnetic moment transitions that occur at a fixed frequency. In FIG. 11, dark shaded areas in bursts 306 and 308 indicate areas that have magnet moments that point to the right side of the page and white areas in bursts 306 and 308 indicate areas with magnetic moments that point to the left side of the page. Bursts 306 and 308 are radially separated from each other by a track width, which in one embodiment is the width of the read/write head being tested. In addition, each burst has a radial width equal to the track width. Although such widths are preferred, those skilled in the art will recognize that bursts 306 and 308 can have different widths and can be separated by different distances.

"B" burst region 304 includes three bursts 310, 312, and 314 that each have a series of magnetic transitions which occur at a fixed frequency. Each of the "B" bursts has the same width and is radially separated from each other "B" burst by a distance equal to the track width.

The bursts of "A" burst region 302 are radially offset from the bursts of "B" burst region 304 such that "A" burst 306 and "B" burst 312 each have an edge running along a track center line 316, but "A" burst 306 is radially inside track center line 316 and "B" burst 312 is radially outside track center line 316.

"A" burst region 302 and "B" burst region 304 are separated circumferentially by an isolation area 318 and two tolerance regions 320 and 322. Isolation area 318 is the normal separation distance between burst regions found in most servo systems in most disc drives. Tolerance areas 320 and 322 are added under the present invention because of the variations introduced into the servo tracking system due to the jitter of the index hardware. In particular, the spindle encoder introduces timing variations that may cause burst regions to overwrite each other unless tolerances such as tolerance areas 320 and 322 are written into the servo areas. In addition to tolerance areas 320 and 322, there is a leading tolerance area 324 before "A" burst region 302 and a trailing tolerance area 326 after "B" burst region 304.

Figure 12:
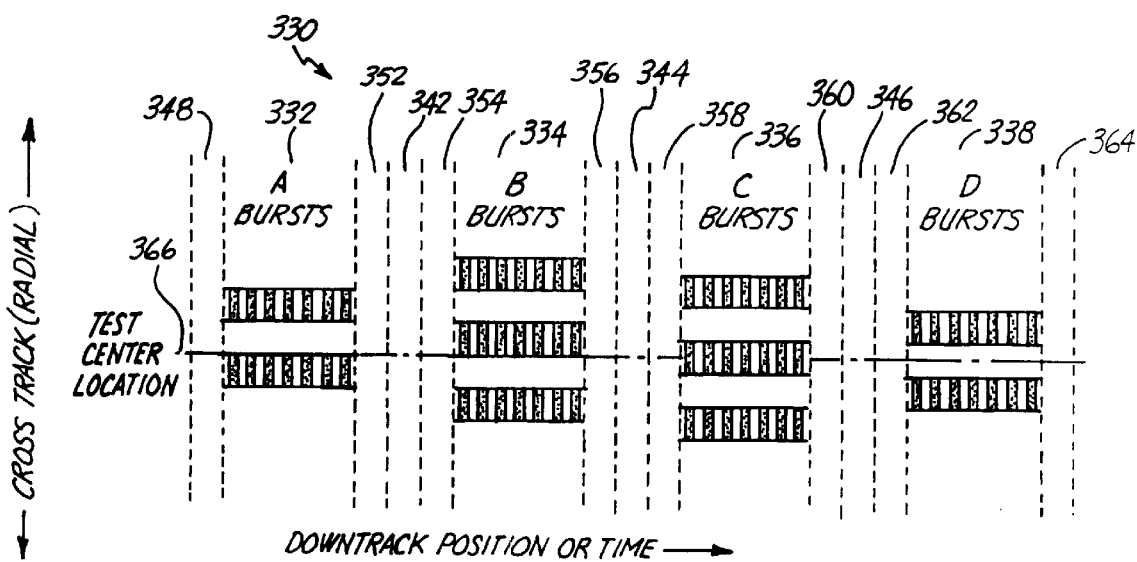
FIG. 12 is a more detailed diagram of a servo region under an alternative embodiment.

FIG. 12 shows a layout for a servo region 330 representing a second embodiment of a servo region of the present invention. In servo region 330, "A" burst region 332 and "B" burst region 334 provide a normal contribution to the servo signal and "C" burst region 336 and "D" burst region 338 provide a quadrature portion of the servo signal. The servo bursts of "C" burst region 336 are radially offset by one-half of a track width from the bursts of "B" burst region 334 so that servo burst 340 of "C" burst region 336 is centered on track center line 366. The servo bursts of "D" burst region 338 are radially offset from the bursts of "C" burst region 336 by one track width. Servo region 300 includes isolation regions 342, 344 and 346 and tolerance areas 348, 352, 354, 356, 358, 360, 362, and 364, which are similar to the isolation regions and tolerance areas described above for FIG. 11.

For the servo layout of FIG. 11, a single position error signal is generated to identify the offset of the head with respect to the center of the track. In one embodiment, this position error signal is formed mathematically as:

$$PES = \frac{A-B}{A+B} \qquad \text{EQ. 1}$$

Where "A" and "B" are the amplitude estimates of the read signal generated from the "A" and "B" burst regions respectively. The normalization of the difference of the two amplitudes by the sum of the two amplitudes is preferable, but not necessary. Methods of demodulating servo patterns to obtain their amplitude estimates are well known. For example, U.S. Pat. No. 4,530,019 entitled "SERVO PATTERNS" contains a description of one such implementation.

For the servo layout of FIG. 12, an additional position error signal can be calculated as:

$$PES = \frac{C-D}{C+D} \qquad \text{EQ. 2}$$

Where "C" and "D" are the amplitude estimates of the read signal generated from the "C" and "D" burst regions respectively. This position error signal is known as a quadrature position error signal, while the position error signal of Equation 1 is referred to as the normal position error signal. Methods of combining these two position error signal estimates are well known. In one simple method, the servo system commutates between the two position error signal estimates to stay in the most linear region of each while moving in the cross track direction.

There are multiple ways of forming the amplitude estimates of the "A", "B", "C" and "D" burst regions. Common to all methods, however, is the formation of demodulation timing signals that indicate when to look for the respective bursts. These timing signals are formed by test electronics under the present invention, which use the spindle index as a reference. As discussed above, this spindle index can jitter by as much as ±100 nsec from revolution to revolution. Therefore, to ensure that the entire burst is demodulated, the timing signals generated by the test electronics are generally made long enough so that if the timing signal were centered on a burst, the high portion of the timing signal would encompass the tolerance areas before and after the burst. For example, a timing signal for demodulating "A" burst 308 of FIG. 11 would be long enough to encompass tolerance area 324, "A" burst 308, and tolerance area 320.

Amplitude estimates of the respective bursts can be formed in several different ways. Under one embodiment of the present invention, asynchronous methods of detection are used, such as peak detection with a qualifier threshold, or root-mean square detection to provide an average estimate of the signal. These types of circuits are standard and well known.

Figure 13:
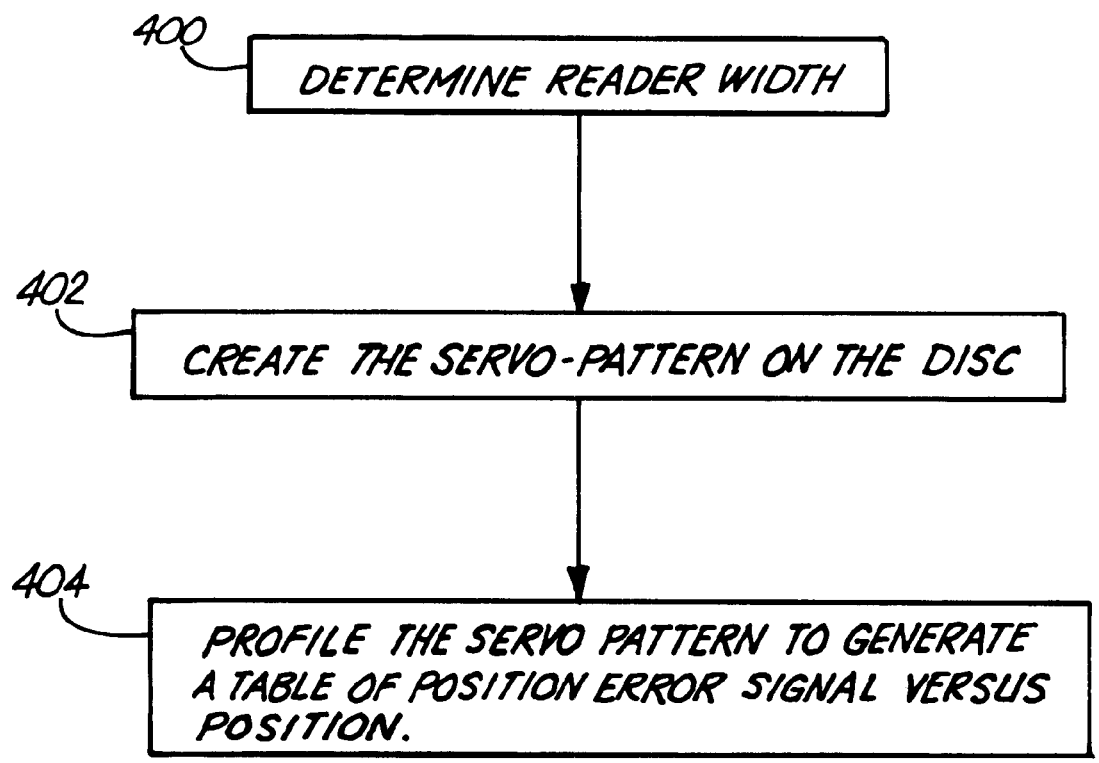
FIG. 13 is a flow diagram for initializing a disc under the present invention.

FIG. 13 provides a flow diagram for initializing the spin-stand for testing under one embodiment of the present invention. At step 400 of FIG. 13, the width of the read head is determined so that it can be used to define the track pitch at which data will be written to the disc. By matching the track width to the reader width, this embodiment of the invention produces a more linear position error signal. In particular, this width matching helps to prevent the position error signal from having regions of non-zero gain, which make position estimation difficult. The reader width can be determined using a number of different methods. In one embodiment, a broad track is written to the disc and then the read head is moved radially across the full track. By measuring the change in the amplitude of the read signal as the read head is moved radially across the track, the width of the read head can be determined. Such a full track scan can be implemented using the piezo element of the spin-stand and does not require the activation of any of the microactuators on the suspension.

Alternatively, a very thin track can be written to the disc and a microtrack profile can be taken to estimate the electrical reader width. Such a microtrack profile is generated by radially moving the read head across the track and recording where the read head generates a read signal.

Once the reader width has been determined, the initialization process continues at step 402 where a servo pattern is written to the disc. Under one embodiment, the servo pattern is generated by moving a write head to a test radius, offsetting the head by one-half of the reader width, and writing a series of "A" bursts at selected locations around the disc. The write head is then radially offset away from the spindle by an additional reader width and "B" bursts are written circumferentially around the disc at designated servo areas. The circumferential location of the "A" and "B" bursts around the disc is controlled in part by the index on the spindle read by the test circuitry.

A second set of "B" bursts is then written to the disc by moving the write head so that it is offset from the track centerline toward the spindle by one-half of a reader width. Once the second set of "B" bursts has been written, a second set of "A" bursts can be written by moving the write head an additional reader width toward the spindle.

In many embodiments, the two sets of "A" and "B" bursts described above should be sufficient to perform track following. However, for extremely narrow track widths, additional sets of bursts may be needed. It is noted that as a general rule, one set of bursts should be written beyond the furthest expected extent of motion of the head so that the last servo null has a trimmed track on the outer side of the pattern.

Once the servo patterns have been written to the disc at step 402, the process of FIG. 13 continues at step 404 where the servo regions are profiled to generate a table that relates position error signals to actual positions over the disc. Under one embodiment, this step is accomplished using the fine positioning mechanism of the spin-stand. In particular, a controller in test box 148 or circuit board 130 generates a series of position values that represents desired positions for the head. Based on these values, piezo element 140 steps the head radially through the servo bursts. At each step, the position value and the value of the position error signal are stored in a table.

Figure 14:
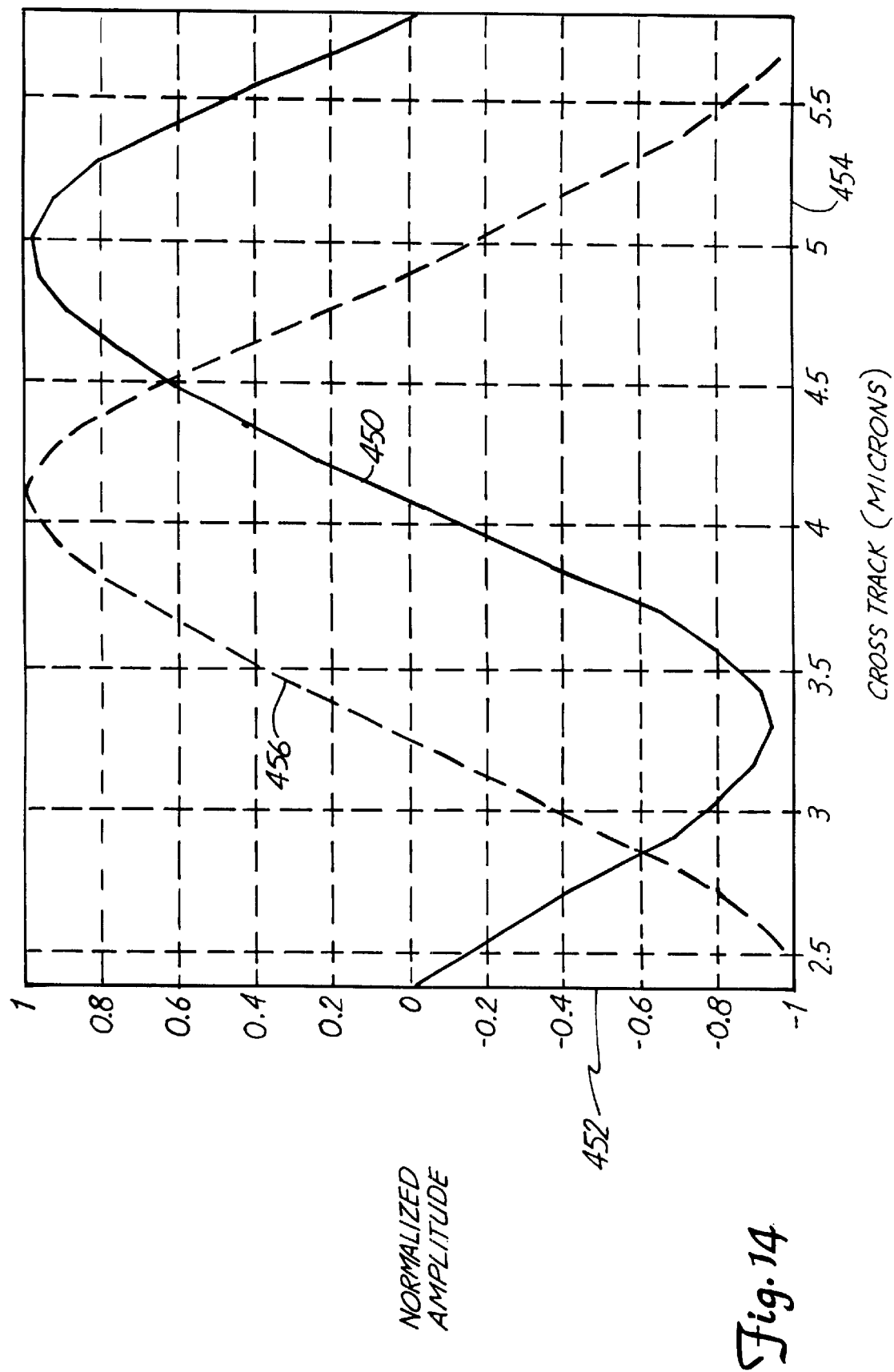
FIG. 14 is a graph relating position error signal to actual position.

When the head has been stepped across the entire track, the table contains enough values to determine the position of the head for any possible position error signal. FIG. 14 provides a graph 450 based on such a table that relates normal position error signal values, shown on vertical axis 452, to actual positions, shown on horizontal axis 454. FIG. 14 also shows a graph 456 that relates quadrature position error signal values to cross track positions.

In nearly all embodiments, the step size for creating the table is chosen so that there is adequate resolution of the position error signal. In addition, in one embodiment, the servo burst regions are sampled over a radial distance that is larger than the expected range of motion of the head. This will ensure that the table contains values for all possible positions of the head.

Figure 15:
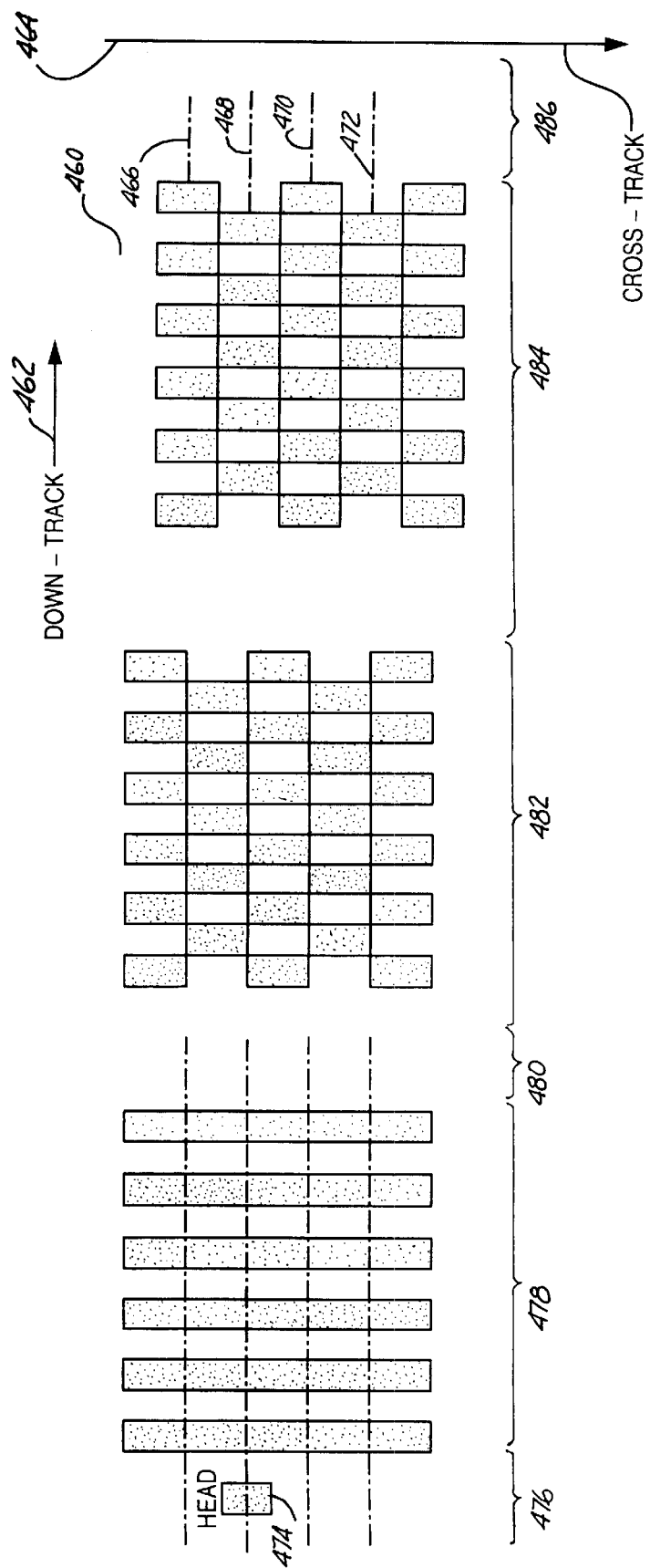
FIG. 15 is a diagram of a servo region under an alternative embodiment of the present invention.

In other embodiments of the invention, a null-type servo pattern is used instead of the split-burst servo patterns of FIGS. 11 and 12. An example of a null-type servo pattern that may be used in the present invention is shown as pattern 460 of FIG. 15. In FIG. 15, the radial dimension of the disc is shown vertically, and the angular dimension of the disc is shown horizontally, with arrow 462 indicating the down-track direction and arrow 464 indicating a cross-track or radial direction. There are four track centers 466, 468, 470, and 472 with head 474 being aligned with track center 468.

The shaded regions in FIG. 15 correspond to regions of opposite magnetic polarity as compared to the non-shaded regions. For example, in a longitudinal recording system, if the longitudinal magnetization in the non-shaded regions were right-to-left in the figure, then the longitudinal magnetization in the shaded regions would be left-to-right. Within these regions, the magnetic medium is saturated in either longitudinal direction, as is standard practice in digital magnetic recording.

Servo sector 460 includes leading field 476, "sync" or "phase" field 478, middle field 480, normal position error field 482, quadrature position error field 484 and trailing field 486. Leading field 476, middle fields 480 and trailing field 486 may be "empty" as shown in FIG. 15 or may include additional servo data. For example, in many embodiments, leading field 476 includes an index mark. Phase field 478 contains radially coherent magnetic transitions. As head 474 passes over phase field 478, the magnetization pattern within phase field 478 induces an oscillating signal in the output of head 474. Normal position error field 482 and quadrature position error field 484 contain null-type magnetic patterns. The quadrature magnetic pattern of quadrature position error field 484 is offset by one-half of a track width with respect to the normal magnetic pattern of normal position error field 482. In some null-type servo patterns, the quadrature magnetic pattern is split in half by placing half of the quadrature pattern before the normal pattern and half of the quadrature pattern after the normal pattern.

Phase field 478 and the position error fields are typically written with reference to a separate clock track. In most embodiments, the clock track is written by a separate clock head that is typically supported on a separate stage from the read head under test. In some embodiments, the clock track is not written on the same disc surface as the phase field and the position error fields but instead is written on a different surface on the same disc or on a separate disc. In systems that use a separate disc, both discs share a common spindle.

Once the servo fields have been written and the position look-up table has been generated, a number of different microactuator tests can be performed. These tests include a hysteresis measurement, a frequency response measurement, and a non-linearity measurement. Each of these tests is described below.

Figure 16:
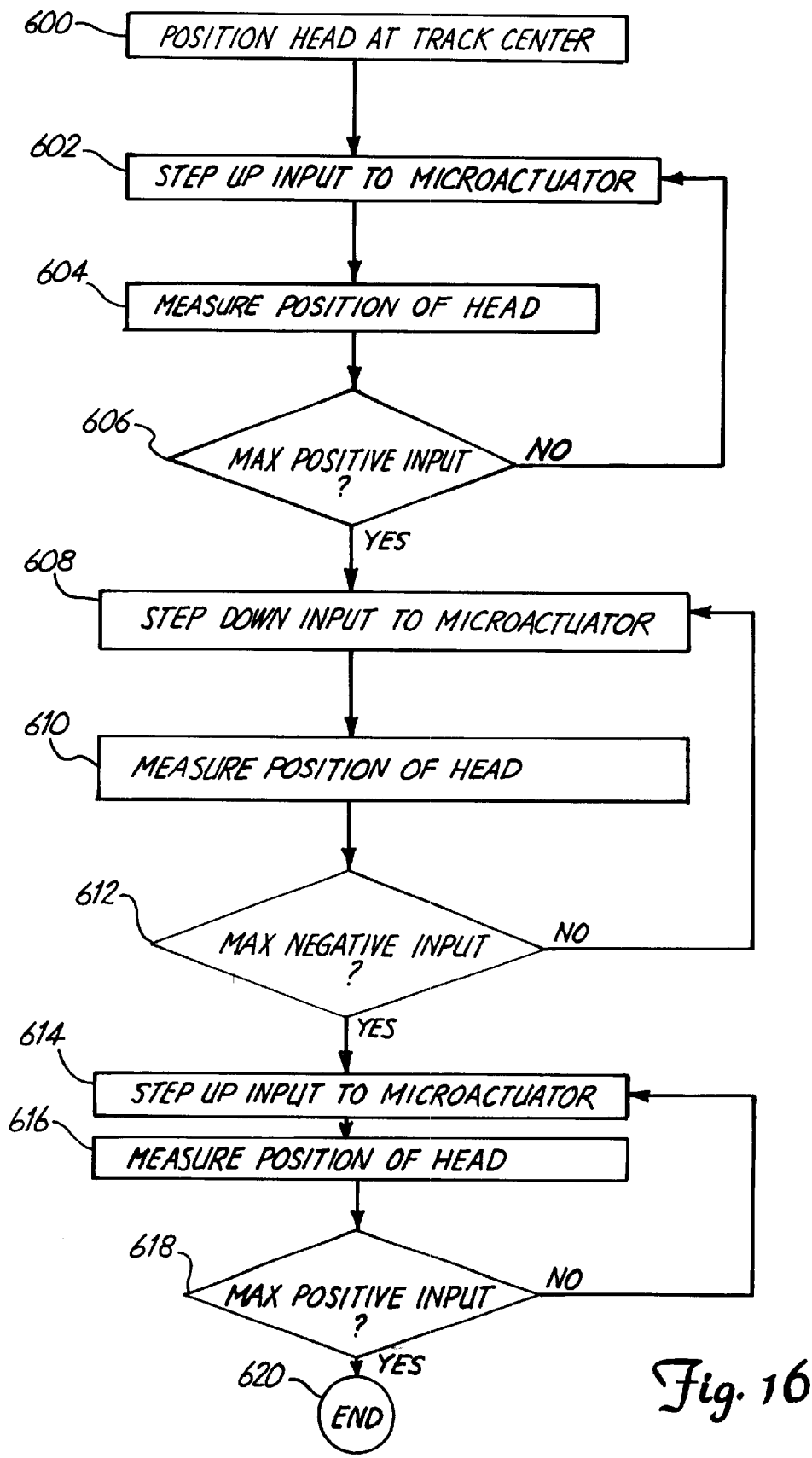
FIG. 16 is a flow diagram of a hysteresis testing method under one embodiment of the present invention.

A hysteresis measurement indicates the degree to which a microactuator's movement is dependent on its past position. FIG. 16 provides a flow diagram for performing such a hysteresis measurement. In FIG. 16, the head is first positioned at a track center at step 600. This positioning is done entirely by the spin-stand piezo element, such that no voltage or current is applied to the microactuators to be tested.

At step 602, the input to a single microactuator is stepped up. Depending on the microactuator, this can involve either stepping up the voltage and/or the current to the microactuator. The stepped-up input to the microactuator causes the microactuator to move the head. At its new position, the read head generates a read signal that is demodulated to identify a position error value. This value is then applied to the position look-up table at step 604 to determine the position of the head. The head's position and the amount of input applied to the microactuator to cause the head to reach that position are then stored in a table for latter use. At step 606 the method determines if it has reached the maximum positive input for the microactuator. If it has not reached the maximum input, the process returns to step 602 were the input is stepped up once again.

When the maximum positive input is reached at step 606, the process continues at step 608 where the input to the microactuator is stepped down by an amount equal to the step sizes used in step 602. The position of the head is then measured at step 610 and the value of the input to the microactuator and the position of the head are stored for later use. At step 612, the method determines if it has reached the maximum negative input for the microactuator. If it has not reached the maximum negative input, the process returns to step 608.

When the maximum negative input is reached at step 612, the process continues at step 614 where the input to the microactuator is once again stepped up. The position of the head is then measured and recorded at step 616 along with the input to the microactuator. At step 618, the method determines if it has once again reached the maximum positive input for the microactuator. If is has not reached the maximum positive input, the method returns to step 614. When the method reaches the maximum positive input at step 618, the process ends at step 620.

Figure 17:
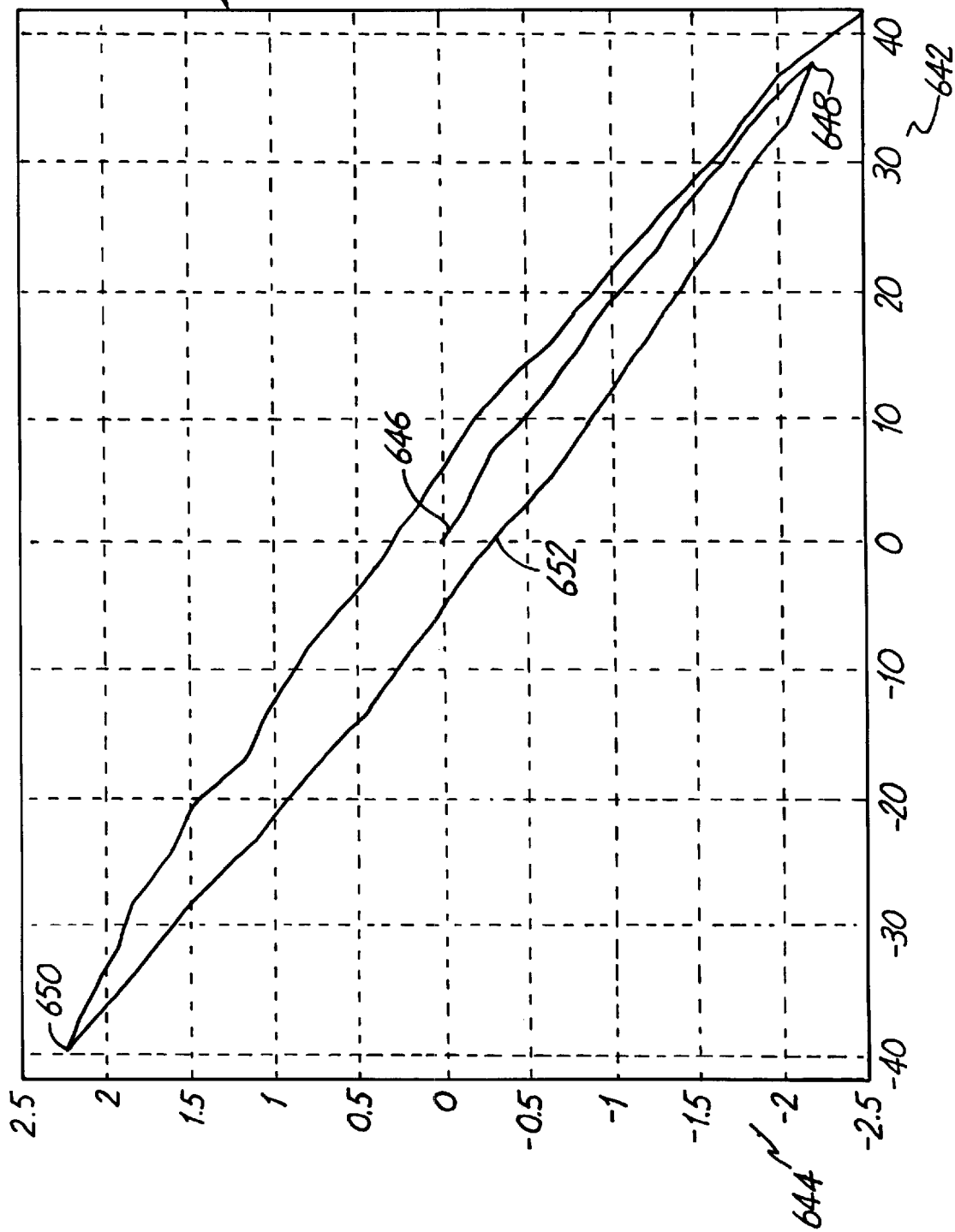
FIG. 17 is a hysteresis graph produced by one embodiment of the present invention.

The process of FIG. 16 produces a sequence of input values and head positions. A graph 640 of the position values and their respective input values is shown in FIG. 17. In FIG. 17, the applied input to the microactuator is shown along horizontal axis 642 and the resulting position of the head is shown along vertical axis 644. Graph 640 begins from point 646 where no input has been applied to the microactuator and the head is positioned over the track center. The graph then extends down to the right to a point 648 where the maximum positive input has been applied to the microactuator. The graph then returns up to the left to a point 650 representing the maximum negative input applied to the microactuator. Note that as the applied input to the microactuator returns to zero at point 652, the head is not at track center but is deflected due to the hysteresis of the microactuator.

Another embodiment of the present invention measures the frequency response of a microactuator. In one embodiment, this test is performed by applying a sinusoidal input to the microacutator. In a preferred embodiment, the sinusoidal input is referenced to the spindle index so that the phase of the frequency response can be determined as well as the magnitude of the frequency response. Preferably, the same frequency reference is used for the sinusoidal microactuator input and the spindle speed regulator. If this is not the case, the phase between the spindle and the input signal can drift.

Figure 18:
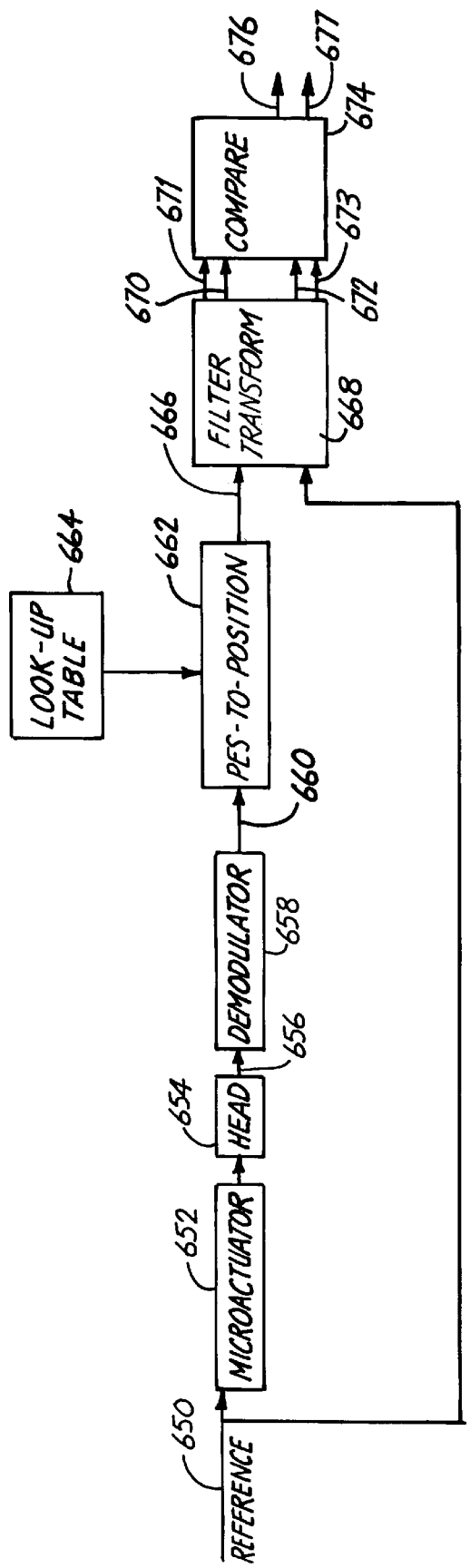
FIG. 18 is a block diagram of servo readings and for testing the frequency response of a microactuator under an embodiment of the present invention.

FIG. 18 provides a block diagram for a test apparatus used in performing a frequency response measurement of a microactuator. In FIG. 18, a sinusoidal reference signal 650 is provided to a microactuator 652. Based on the sinusoidal input signal, microactuator 652 moves head 654. As it moves, head 654 reads servo information from the disc and thereby generates a servo read signal. The servo read signal is provided to a demodulator 658, which demodulates the signal to produce a position error signal 660 as described above. Position error signal 660 is provided to PES-to-position converter 662 as a search value for searching a position error signal-to-position look-up table 664. Based on this search, converter 662 generates a position value signal 666 that is input to a filter transform module 668. Filter transform module 668 also receives microactuator input 650.

Filter transform module 668 filters and transforms the microactuator input signal and the position value signal to identify a magnitude and phase for a frequency component of each signal. In most embodiments, the selected frequency component is the primary frequency of input signal 650. The filtering and transform functions of module 668 can be achieved by performing a single point Fourier transform at the desired frequency or by performing a fast Fourier transform across a spectrum of frequencies and selecting the magnitude and phase of a desired frequency. The magnitude and phase identified for position signal 666 are provided on outputs 670 and 671 to a compare module 674. The magnitude and phase associated with microactuator input 650 are provided on outputs 672 and 673 to compare module 674.

Compare module 674 compares the magnitudes of the frequency component in the two respective signals to identify the gain of the microactuator at the selected frequency. Compare module 674 can also compare the phases of the frequency component in the two signals to identify a phase shift associated with microactuator 652. The gain of the microactuator and the phase shift of the microactuator are then output along outputs 676 and 677.

Figure 19:
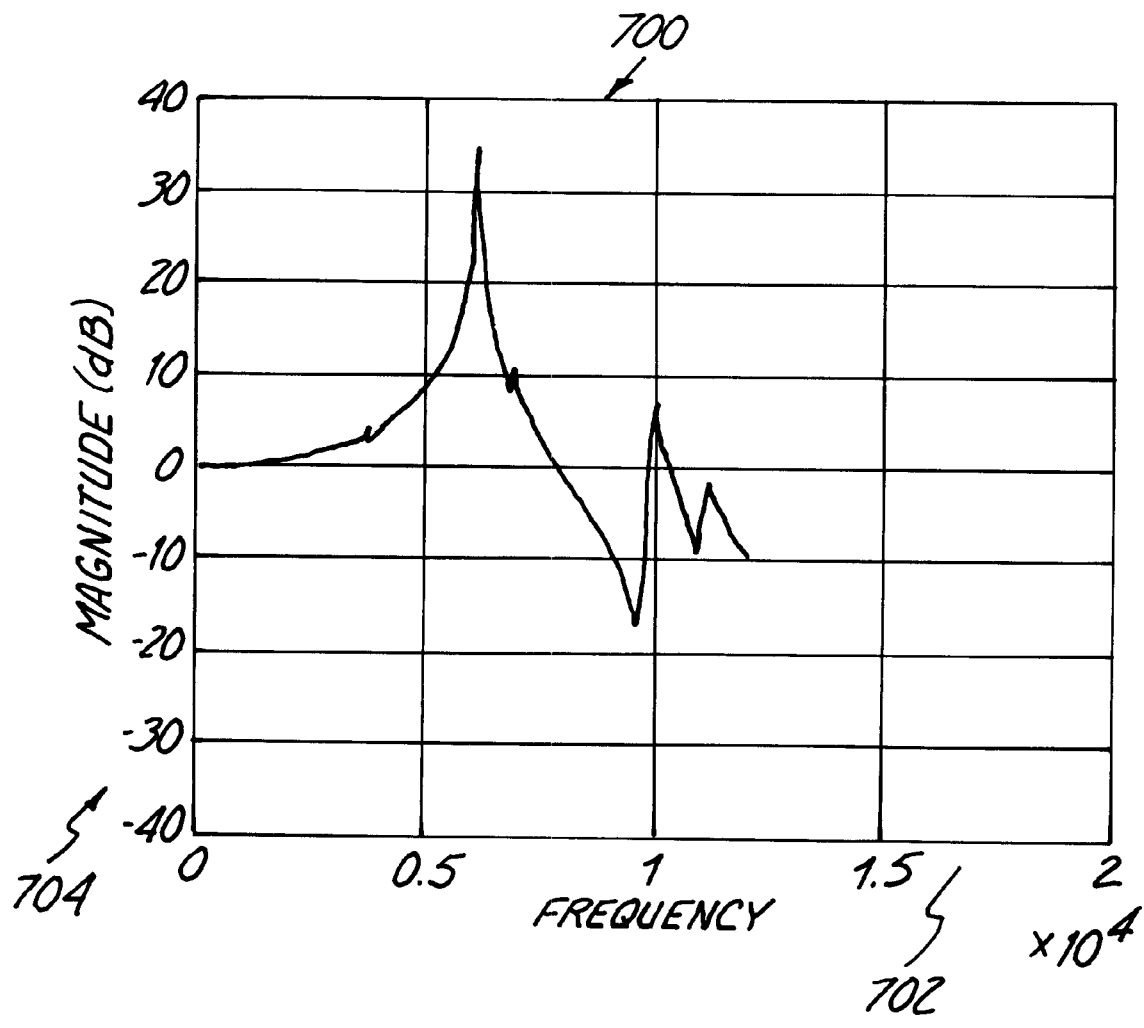
FIG. 19 is a graph of the frequency response of a microactuator determined using a process of the present invention.

By repeating the process described above for different component frequencies, the complete frequency response of a microactuator can be determined. The shape of this frequency response can then be examined to determine if the microactuator falls within specifications. In particular, the frequency response can be examined to determine if there are any resonant frequencies. The frequency response can also be examined to determine the DC gain of the microactuator and to determine if the microactuator has a sufficiently high bandwidth for a desired disc drive. FIG. 19 shows a graph 700 of the magnitude frequency response for a microactuator that was produced using the process described above. In FIG. 19, frequency in units of 5 kHz is shown along horizontal axis 702 and magnitude in decibels is shown along vertical axis 704.

The frequency response measurement described above is augmented in another embodiment of the present invention by determining the frequency response of the microactuator using different input signal amplitudes. Ideally, a microactuator has a linear response to changes in the amplitude of the input signal. In other words, the distance that the head moves across a track with each oscillation of the input signal should be a linear function of the amplitude of the input signal. Actual microactuators, however, do not behave linearly. By examining the change in the frequency response as the amplitude of the input signal is changed, the amount of non-linearity in the microactuator can be determined. The measured change in the frequency response can be compared to a specification to determine if the microactuator is fit enough to be placed in a disc drive.

Figure 20:
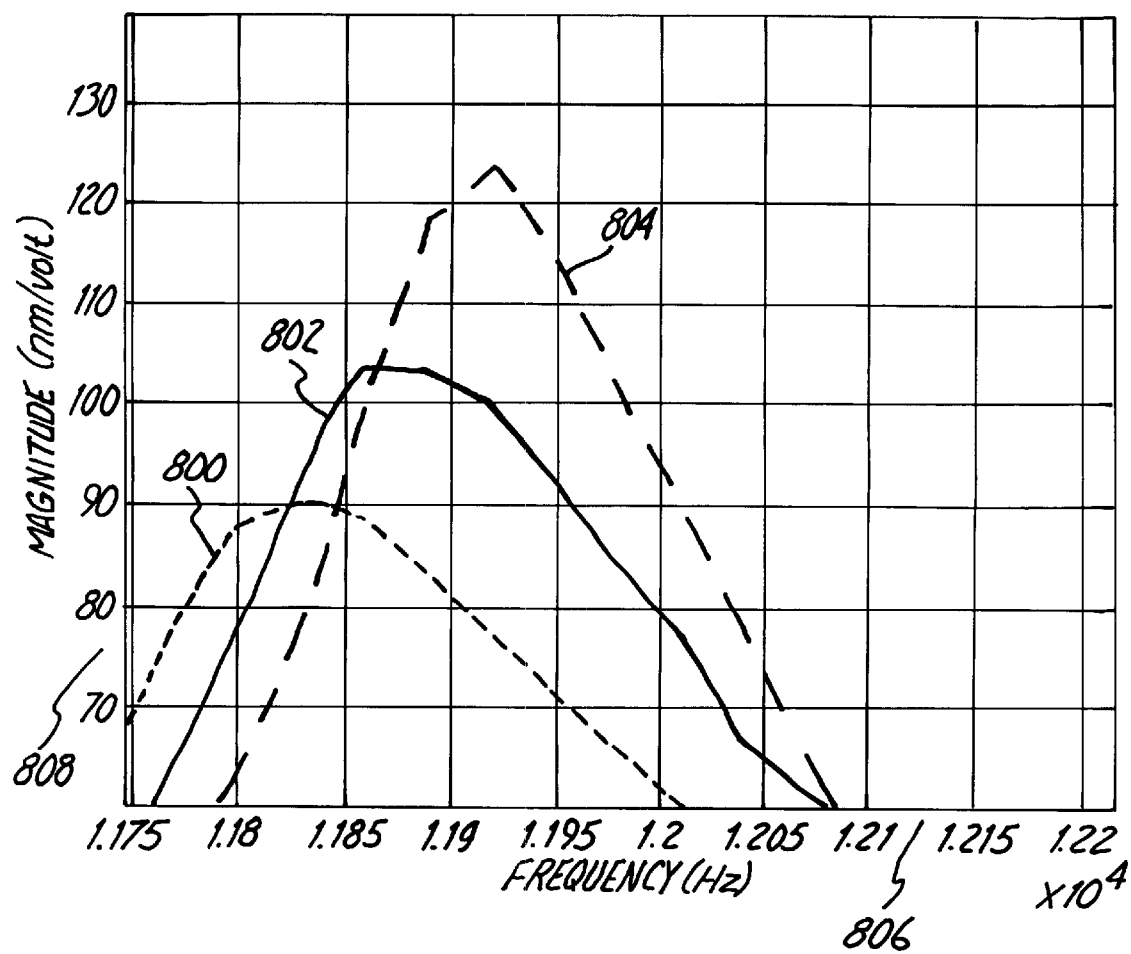
FIG. 20 is a graph of the non-linearity of a microactuator that is determined using a process of the present invention.

FIG. 20 provides graphs of three frequency responses for a microactuator driven by three different voltages. Specifically, graphs 800, 802, and 804 show how far the microactuator moves for applied voltages of 0.5, 2.5 and 5 volts respectively. In FIG. 20, frequency is shown along horizontal axis 806 and the distance the microactuator moves is shown in units of nanometers per applied volt along vertical axis 808. From FIG. 20, it can be seen that as the applied voltage increases, the peak of FIG. 20 shifts to a higher frequency and the magnitude increases.

Although hysteresis, frequency response, and non-linearity tests have been described above, the present invention is not limited to these tests. Other known tests for microactuators can be run under the present invention by using the testing system described above.

In summary, the present invention provides a method of testing a microactuator that is part of a suspension assembly for a disc drive before placing the suspension assembly in a disc drive. The method includes steps of positioning head 654 over a disc based in part on servo information 656 read from the disc. At least one input signal 650 is applied to at least one microactuator 652 on the suspension assembly 144. Servo information 656 is then read from the disc to determine a position 666 of the head 654. The position 666 of head 654 is compared to the applied input signal 650 to determine a performance characteristic of the microactuator 652. In one embodiment, the measured performance characteristic is a hysteresis of microactuator 652. In other embodiments, the measured performance characteristic is the frequency response of microactuator 652.

An apparatus 100 for testing a microactuator that forms part of a suspension assembly includes a disc 106 that is separate from the disc drive and capable of spinning. Apparatus 100 also includes a positioning system 108, 140, 142, 116 capable of positioning the head relative to a track on the disc. A microactuator control 130, 148 is provided that generates at least one input signal to at least one microactuator 170, 172. A position measurement system 130, 148 is capable of determining the position of the head over the track and a microactuator test controller 130, 148 that is capable of determining a microactuator performance characteristic based on the input signal to the microactuator 170, 172 and the position of the head.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, other microactuator tests may be performed without departing from the scope and spirit of the present invention. Other modifications can also be made.

What is claimed is:

1. A method of testing a microactuator that is part of a suspension assembly for a disc drive before placing the suspension assembly in a disc drive, the method comprising steps of:
   (a) positioning a head over a track on a disc outside of a disc drive based in part on servo information read from the disc;
   (b) applying at least one input signal to at least one microactuator on the suspension assembly;
   (c) reading servo information from the disc to determine an amount of change in the position of the head; and
   (d) comparing the amount of change in the position of the head to the input signal applied to microactuator to determine a performance characteristic of the microactuator.

2. The method of claim 1 wherein applying step (b) comprises applying a step input to the microactuator.

3. The method of claim 2 further comprising repeating applying step (b), reading step (c) and comparing step (d) for a set of different step inputs.

4. The method of claim 3 wherein the measured performance characteristic is the hysteresis of the microactuator.

5. The method of claim 4 wherein the values of the step inputs in the set of different step inputs increase to a maximum input then decrease to a maximum negative input then return to the maximum positive input.

6. The method of claim 1 wherein applying step (b) comprises applying a sinusoidal input signal.

7. The method of claim 6 wherein the measured performance characteristic is the frequency response of the microactuator.

8. The method of claim 7 wherein applying step (b) comprises sequentially applying input sinusoidal signals of different frequencies.

9. The method of claim 7 wherein applying step (b) further comprises sequentially applying sets of input sinusoidal signals, each set comprising a sequential series of sinusoidal signals of different frequencies but nearly identical amplitudes, wherein sinusoidal signals in different sets have different amplitudes.

10. The method of claim 9 wherein the measured performance characteristic is the linearity of the microactuator.

11. An apparatus for testing a microactuator that forms part of a suspension assembly designed for use in a disc drive, the suspension assembly supporting at least one read head, the apparatus comprising:
   a disc that is separate from a disc drive and capable of spinning;
   a positioning system capable of positioning the read head relative to a track on the disc;
   a microactuator control capable of providing at least one input signal to at least one microactuator;
   a position measurement system capable of determining the position of the head over the track; and
   a microactuator test controller capable of determining a microactuator performance characteristic based on the input signal to the microactuator and the position of the head.

12. The apparatus of claim 11 wherein the microactuator control is capable of generating an input signal that oscillates between the maximum positive input and the maximum negative input for the microacutator and wherein the microactuator test controller is capable of determining a hysteresis characteristic for the microactuator based on this input signal and the resulting changes in the position of the head.

13. The apparatus of claim 11 wherein the microactuator control is capable of generating a sequence of sinusoidal input signals, each sinusoidal input signal at a different frequency, and wherein the microactuator test controller is capable of determining a frequency response characteristic of the microactuator based on the frequencies of the input signals and the resulting movement of the head.

14. The apparatus of claim 13 wherein the microactuator test controller comprises a transform module capable of isolating a magnitude for a particular frequency of movement of the head.

15. The apparatus of claim 11 wherein the microactuator control is further capable of applying sets of input sinusoidal signals, each set comprising a sequence of sinusoidal signals of different frequencies but nearly identical amplitudes, wherein sinusoidal signals in different sets have different amplitudes.

16. The apparatus of claim 14 wherein the microactuator test control is capable of determining a linearity characteristic for the head based on the sets of input sinusoidal signals and the resulting movement of the head.

17. An apparatus for testing a microactuator forming part of a suspension assembly, the apparatus comprising:

a spin-stand having a spindle that rotates a disc and support that supports the suspension assembly; and microactuator testing means for testing the microactuator on the suspension assembly.

* * * * *